UNITED STATES PATENT OFFICE.

BENJAMIN JOHNSON AND WOOSTER P. GIDDINGS, OF GARDINER, MAINE; SAID GIDDINGS ASSIGNOR TO SAID JOHNSON.

FERTILIZER.

SPECIFICATION forming part of Letters Patent No. 234,782, dated November 23, 1880.

Application filed August 9, 1880. (No specimens.)

*To all whom it may concern:*

Be it known that we, BENJAMIN JOHNSON and WOOSTER P. GIDDINGS, citizens of the United States, residing at Gardiner, in the county of Kennebec and State of Maine, have invented certain new and useful Improvements in Fertilizers; and we do hereby declare the following to be a full, clear, and exact description of the invention, such as will enable others skilled in the art to which it appertains to make and use the same.

Our composition consists of the following ingredients, combined in the proportions stated, viz: ground and unburned oyster-shells, one hundred pounds; common potash or carbonate of potassium, two pounds; carbonate of soda, one pound. These ingredients are to be thoroughly pulverized and mixed together, the shells particularly being ground as fine as possible.

In using this composition it is to be applied to the soil in any desired quantity. Good results will be obtained with one ton to the acre. The carbonate of lime contained in the oyster-shells being in a finely-subdivided state is rendered more solubly than it otherwise would be, and the reaction of the other ingredients upon it also tends to make it still more soluble.

The oyster-shells not only furnish to the land the carbonate of lime, which is a valuable plant-food, but they also furnish certain quantities of chloride of sodium and animal matter, both of which are valuable to the plant.

We are aware that oyster-shells have before been burned and used as a fertilizer; but we are not aware that they have ever been used ground and unburned combined with the elements we have stated.

The design of our fertilizer is to use the valuable fertilizing qualities of the oyster-shell, vast quantities of which are at present wasted, by putting it in a form where it will be readily dissolved and assimilated in the plant.

The proportions of soda and potash may be varied, but the oyster-shells must always form the bulk of the fertilizer.

What we claim is—

The fertilizer compound substantially as herein described, consisting of ground and unburned oyster-shells, one hundred pounds; common potash, two pounds; and carbonate of soda, one pound, substantially as set forth.

In testimony whereof we affix our signatures in presence of two witnesses.

BENJAMIN JOHNSON.
WOOSTER P. GIDDINGS.

Witnesses:
S. W. BATES,
FREDERIC DANFORTH.